(12) United States Patent
Roajanasiri et al.

(10) Patent No.: US 8,485,579 B2
(45) Date of Patent: Jul. 16, 2013

(54) VACUUM PICKUP ASSEMBLIES FOR PICKING UP ARTICLES AND MINIMIZING CONTAMINATION THEREOF

(75) Inventors: Reangroaj Roajanasiri, Thanyaburi (TH); Buatip Buasak, Thanyaburi (TH)

(73) Assignee: Western Digital (Fremont), LLC, Fremont, CA (US)

( * ) Notice: Subject to any disclaimer, the term of this patent is extended or adjusted under 35 U.S.C. 154(b) by 139 days.

(21) Appl. No.: 13/050,675

(22) Filed: Mar. 17, 2011

(65) Prior Publication Data

US 2012/0235434 A1  Sep. 20, 2012

(51) Int. Cl.
*B25J 15/06* (2006.01)
*B66C 1/02* (2006.01)

(52) U.S. Cl.
USPC .......................................... 294/185; 294/183

(58) Field of Classification Search
USPC .......... 294/185–189, 64.2, 64.3, 183; 271/90, 271/108; 414/737
See application file for complete search history.

(56) References Cited

U.S. PATENT DOCUMENTS

| 3,999,795 | A | * | 12/1976 | Barker | 294/185 |
| 4,750,768 | A | * | 6/1988 | Kumar | 294/185 |
| 4,925,225 | A | * | 5/1990 | Dost | 294/186 |
| 5,324,087 | A | * | 6/1994 | Shimose et al. | 294/185 |
| 6,039,371 | A | * | 3/2000 | Smith | 294/8.6 |
| 2008/0309910 | A1 | * | 12/2008 | Takahashi | 355/72 |

* cited by examiner

*Primary Examiner* — Paul T Chin

(57) ABSTRACT

Vacuum pickup assemblies for picking up articles and minimizing contamination of the articles are described. One such vacuum pick up assembly includes an end effector configured to contact the article, the end effector coupled to a vacuum section and a purge section, the vacuum section including a vacuum filter pneumatically coupled to the end effector, and a vacuum source pneumatically coupled to the first filter and, in a pick up mode, configured to generate vacuum pressure at the end effector at a preselected vacuum pressure to pick up and retain the article, the purge section including a purge filter pneumatically coupled to the end effector, and a purge source pneumatically coupled to the second filter and, in a release mode, configured to expel a purge gas at the end effector at a preselected purge pressure to release the article.

14 Claims, 2 Drawing Sheets

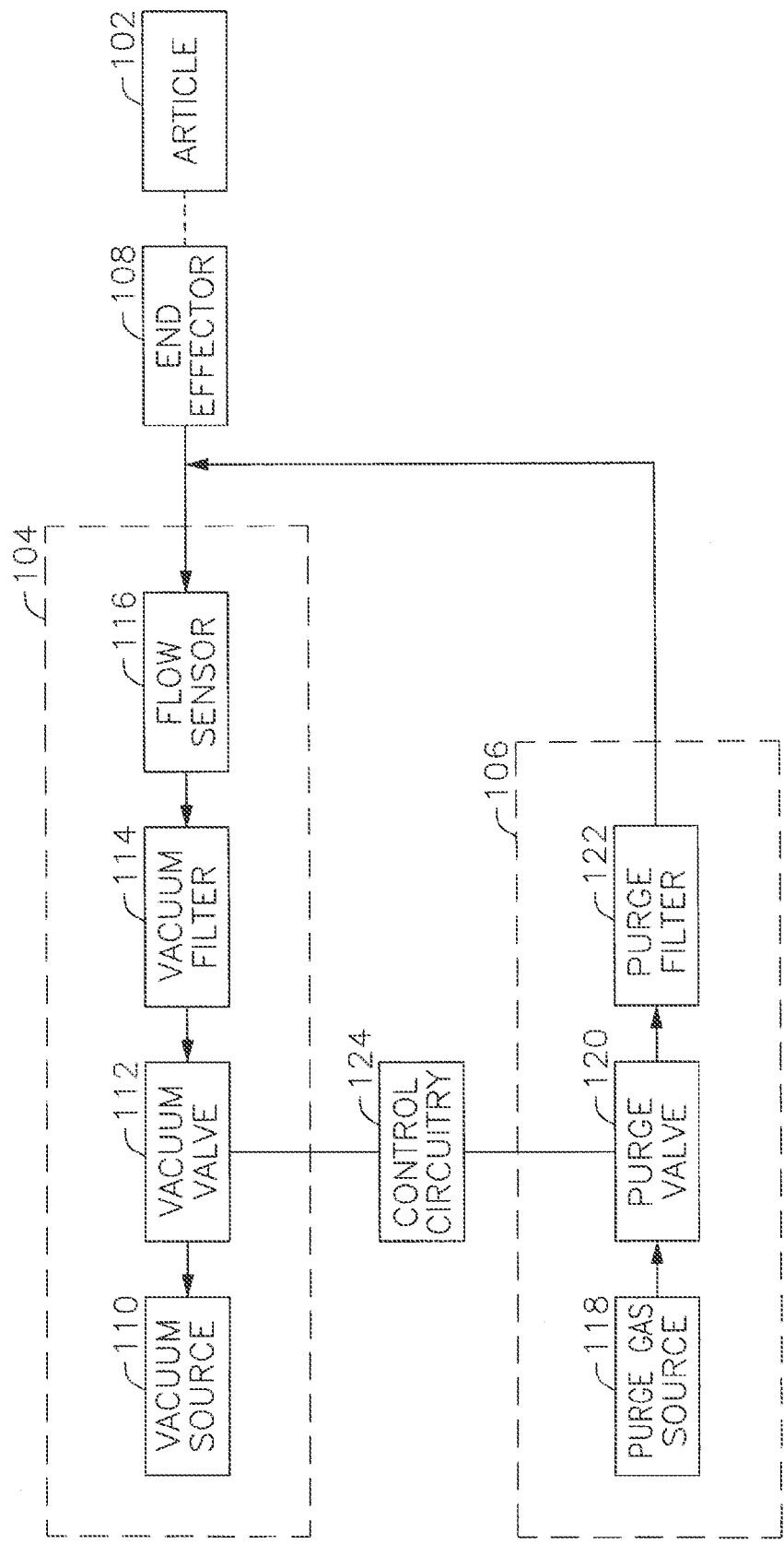

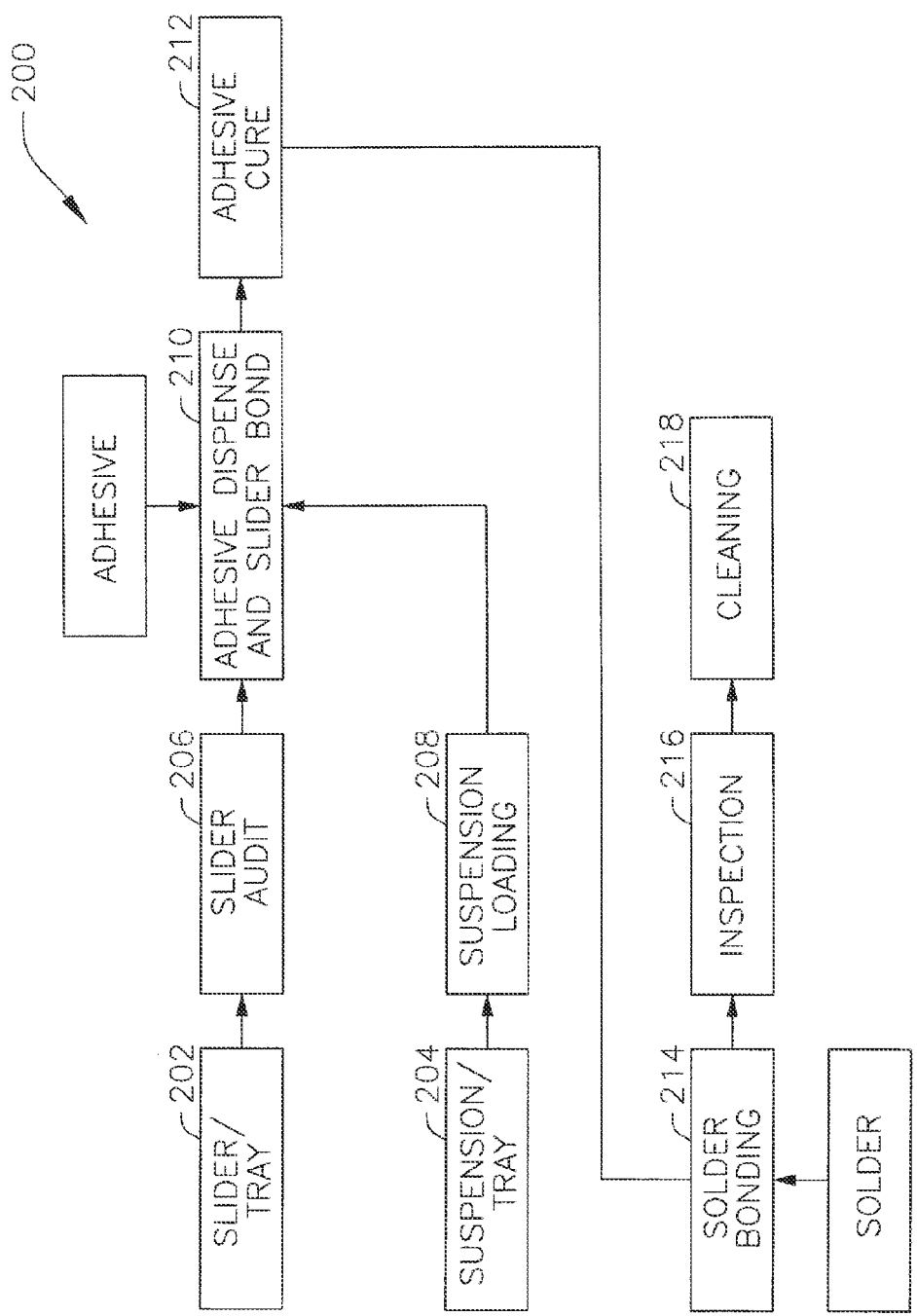

VACUUM PICKUP ASSEMBLIES FOR PICKING UP ARTICLES AND MINIMIZING CONTAMINATION THEREOF

FIELD

The present invention relates to manufacturing tools, and more specifically, to vacuum pickup assembly for picking up articles and minimizing contamination of the articles.

BACKGROUND

In various manufacturing processes, small components or articles often need to be securely moved or held in a fixed position during assembly. In order to secure and hold such articles, a vacuum pick up tool can be used. Conventional vacuum pick up tools commonly include an integrated vacuum and purge assembly. In such systems, a vacuum source and a purge gas source are pneumatically coupled to one end of a filter while an end effector for contacting the articles is coupled to the other end of the filter. To pick up an article, the vacuum source is activated and vacuum pressure is thereby created through the filter and at the end effector for picking up the article. To release the article, the vacuum source is usually de-activated and a purge gas source activated thereby creating purge gas pressure through the filter and at the end effector for releasing up the article. The purge gas is typically air.

In some instances however, the air used as the purge gas contains contaminants that are able to bypass the filter and thereby contaminate the article. In addition, in some instances, the surface of the article initially includes a few contaminants that are sucked to the intake side of the filter closest to the end effector when the article is picked up. In such case, when the purge gas source is activated to release the article, the contaminants previously collected at the intake of the filter are expelled back onto the article thereby re-contaminating the article. Accordingly, a vacuum pick up assembly for picking up articles and minimizing contamination of the articles is needed.

SUMMARY

Aspects of the invention relate to vacuum pickup assemblies for picking up articles and minimizing contamination of the articles. In one embodiment, the invention relates to a vacuum pick up assembly for picking up an article and minimizing contamination thereof, the assembly including an end effector configured to contact the article, the end effector coupled to a vacuum section and a purge section, the vacuum section including a vacuum filter pneumatically coupled to the end effector, and a vacuum source pneumatically coupled to the first filter and, in a pick up mode, configured to generate vacuum pressure at the end effector at a preselected vacuum pressure to pick up and retain the article, the purge section including a purge filter pneumatically coupled to the end effector, and a purge source pneumatically coupled to the second filter and, in a release mode, configured to expel a purge gas at the end effector at a preselected purge pressure to release the article.

BRIEF DESCRIPTION OF THE DRAWINGS

FIG. 1 is a schematic block diagram of a vacuum pickup assembly for picking up an article where the assembly includes a vacuum section and a purge section that are substantially decoupled from one another in order to prevent contamination of the article in accordance with one embodiment of the invention.

FIG. 2 is a schematic flow diagram of a manufacturing process for attaching sliders and suspensions of magnetic storage devices that uses the vacuum pickup assembly of FIG. 1 to pickup and attach the sliders in accordance with one embodiment of the invention.

DETAILED DESCRIPTION

Referring now to the drawings, embodiments of vacuum pickup assemblies for picking up articles and minimizing contamination of the articles are illustrated. The vacuum pickup assemblies include substantially separate vacuum sections and purge sections that are pneumatically coupled at an end effector. In a pickup mode of a pickup assembly, a vacuum source in the vacuum section is configured to generate vacuum pressure at the end effector to pick up and retain an article. In a release mode of the pickup assembly, a purge source in the purge section is configured to expel a purge gas at the end effector to release the article. The vacuum section further includes a vacuum filter for filtering potential contaminants received from the article via the end effector. Similarly, the purge section includes a purge filter for filtering potential contaminants received via the purge gas source thereby ensuring that the potential contaminants are prevented from contacting the article via the end effector. In several embodiments, the purge gas includes nitrogen.

FIG. 1 is a schematic block diagram of a vacuum pickup assembly 100 for picking up an article 102 where the assembly 100 includes a vacuum section 104 and a purge section 106 that are substantially decoupled from one another in order to prevent contamination of the article 102 in accordance with one embodiment of the invention. The vacuum section 104 and purge section 106 are pneumatically coupled just before an end effector 108. The vacuum section 104 includes a vacuum source 110, a vacuum valve 112 pneumatically coupled to the vacuum source 110, a vacuum filter 114 pneumatically coupled to the vacuum valve 112, and a flow sensor 116 pneumatically coupled between the vacuum filter 114 and the end effector 108. The purge section 106 includes a purge gas source 118, a purge valve 120 pneumatically coupled to the purge gas source 118, and a purge filter 122 pneumatically coupled between the purge valve 120 and the end effector 108.

Control circuitry 124 is electrically coupled to the vacuum valve 112 and the purge valve 120. The control circuitry 124 can receive external control signals/instructions and is configured to control operation of the pickup assembly between a pick mode and a release mode. In some embodiments, the control circuitry 124 might also provide for a hold mode where the vacuum pressure to retain the article once it has been picked up is somewhat smaller than an initial vacuum pressure applied in the pickup mode. In some embodiments, the control circuitry 124 is also electrically coupled to the vacuum source 110 and the purge gas source 118. In some embodiments, the vacuum valve 112 can be incorporated into the vacuum source 110. Similarly, in some embodiments, the purge valve 120 can be incorporated into the purge gas source 118.

In one embodiment, the vacuum section 104 does not include a flow sensor. In a number of embodiments, the purge gas includes an inert gas. In one embodiment, the purge gas is nitrogen. In another embodiment, the purge gas can include helium, neon, argon, krypton, and/or xenon. In several embodiments, the vacuum source is configured to generate the vacuum pressure at a preselected vacuum pressure level. In one embodiment, the preselected vacuum pressure level is about 80 kilopascal. In other embodiments, the preselected vacuum pressure level is more than or less than 80 kilopascal. In several embodiments, the purge source is configured to expel the purge gas at a preselected purge pressure level. In one embodiment, the preselected purge pressure level is about 2 bar. In other embodiments, the preselected vacuum pressure level is more than or less than 2 bar.

In several embodiments, the vacuum filter and purge filter are particle filters. In one such embodiment, the vacuum filter is a particle filter that filters particles having a size of about 0.1 micron or larger. In other embodiments, the vacuum particle filter can filter particles having a size that is more than or less than 0.1 micron. In one such embodiment, the purge filter is a particle filter that filters particles having a size of about 0.01 micron or larger. In other embodiments, the purge particle filter can filter particles having a size that is more than or less than 0.01 micron. In several embodiments, the vacuum filter removes contaminants in an ambient gas flowing toward the vacuum source as a result of the vacuum pressure. The contaminants in the ambient gas may have originated from a surface of the article being picked up. In several embodiments, the purge filter removes contaminants in the purge gas before the gas is expelled at the end effector.

In a number of embodiments, the article to be picked up by the vacuum pickup assemblies described herein is a slider for use in conjunction with a magnetic storage drive. Magnetic storage drives use magnetic media to store data and a movable slider having a read/write head positioned over the magnetic media to selectively read data from and write data to the magnetic media. Each slider is a sub-component of a head-gimbal assembly (HGA). The HGA also includes a suspension assembly for holding the slider and providing a plurality of electrical connections thereto. In HGA manufacturing processes, the attachment of sliders and suspensions can be an important sub-process involving substantial slider handling. During these processes involving slider handling, it can be important to keep the slider substantially free of contaminants.

FIG. 2 is a schematic flow diagram of a manufacturing process 200 for attaching sliders and suspensions of magnetic storage devices that uses the vacuum pickup assembly 100 of FIG. 1 to pickup and attach the sliders in accordance with one embodiment of the invention. The process first provides (202) one or more sliders in a tray and provides (204) one or more suspensions in another tray. The process then audits (206) the sliders and loads (208) the suspensions. The process then dispenses adhesive and bonds (210) the sliders and suspensions. In several embodiments, the pickup assembly 100 of FIG. 1 is used to pickup and retain each slider as adhesive is dispensed thereto and it is bonded to a corresponding suspension. The process then cures (212) the adhesive. The process then performs solder bonding (214) using appropriate amounts of solder. The process then inspects (216) the bonded suspension/slider assemblies using one or more inspection sub-processes. The process then cleans (218) the bonded suspension/slider assemblies.

In other embodiments, the pickup assemblies can be used for other appropriate processes or applications where it is desirable to substantially prevent the articles from being contaminated during pickup.

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A vacuum pick up assembly for picking up an article and minimizing contamination thereof, the assembly comprising:
   an end effector configured to contact the article, the end effector coupled to a vacuum section and a purge section;
   the vacuum section comprising:
      a vacuum filter pneumatically coupled to the end effector; and
      a vacuum source pneumatically coupled to the vacuum filter and, in a pick up mode, configured to generate vacuum pressure at the end effector at a preselected vacuum pressure to pick up and retain the article;
   the purge section comprising:
      a purge filter pneumatically coupled to the end effector; and
      a purge source pneumatically coupled to the purge filter;
      wherein the purge source and the purge filter, in a release mode, are configured to expel a purge gas substantially free of contaminants at the end effector at a preselected purge pressure to release the article.

2. The assembly of claim 1, wherein the purge gas comprises nitrogen.

3. The assembly of claim 1, wherein the purge gas comprises an inert gas.

4. The assembly of claim 3, wherein the purge gas comprises a gas selected from the group consisting of helium, neon, argon, krypton, and xenon.

5. The assembly of claim 1, further comprising a flow sensor pneumatically coupled between the vacuum filter and the end effector and configured to measure a rate of flow of an ambient gas subject to the vacuum pressure.

6. The assembly of claim 1, wherein the preselected vacuum pressure is about 80 kilopascal.

7. The assembly of claim 1, wherein the preselected purge pressure is about 2 bar.

8. The assembly of claim 1:
   wherein the vacuum filter comprises a particle filter, and
   wherein the purge filter comprises a particle filter.

9. The assembly of claim 8, wherein the vacuum filter is configured to filter particles of about 0.1 micron or larger.

10. The assembly of claim 8, wherein the purge filter is configured to filter particles of about 0.01 micron or larger.

11. The assembly of claim 8, wherein the vacuum filter is configured to remove contaminants in an ambient gas subject to the vacuum pressure and thereby flowing toward the vacuum source.

12. The assembly of claim 8, wherein the purge filter is configured to remove contaminants in the purge gas prior to expulsion.

13. The assembly of claim 1, wherein the article comprises a slider for a magnetic storage device.

14. The assembly of claim 1, wherein the purge source and the purge filter, in the release mode, are configured to avoid expelling any materials other than the purge gas.

* * * * *